July 16, 1963 O. B. CARLSON 3,097,654
CIGAR TIP APPLYING MACHINE
Filed Aug. 11, 1961 11 Sheets-Sheet 1

INVENTOR
OLOF B. CARLSON
BY
William R. Lieberman
ATTORNEY

INVENTOR
OLOF B. CARLSON
BY William R. Lieberman
ATTORNEY

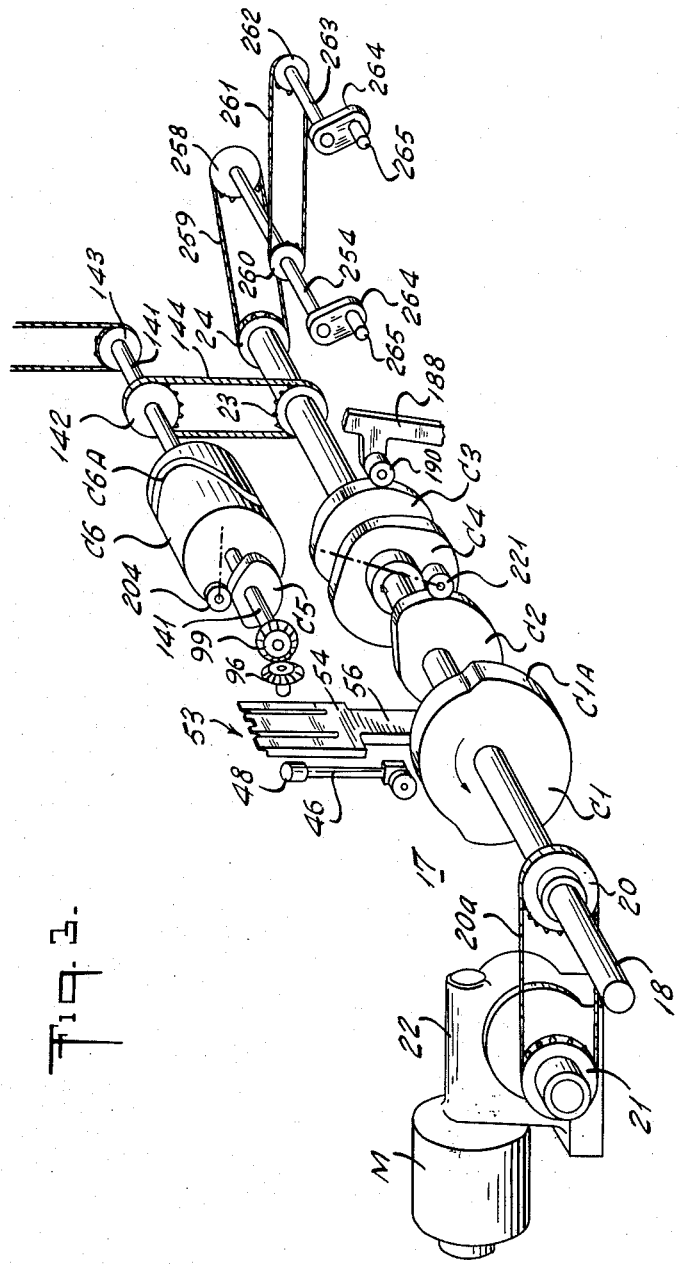

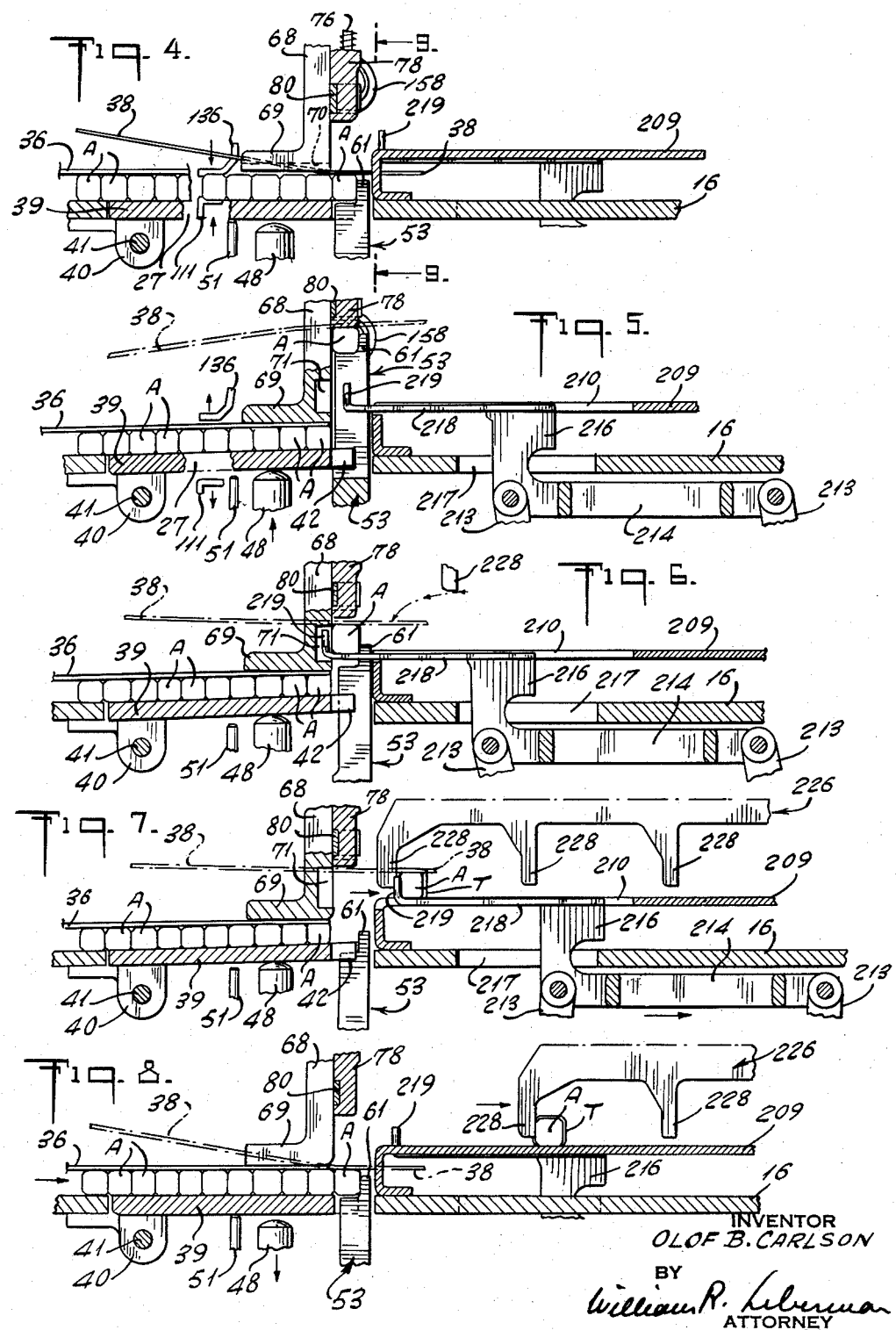

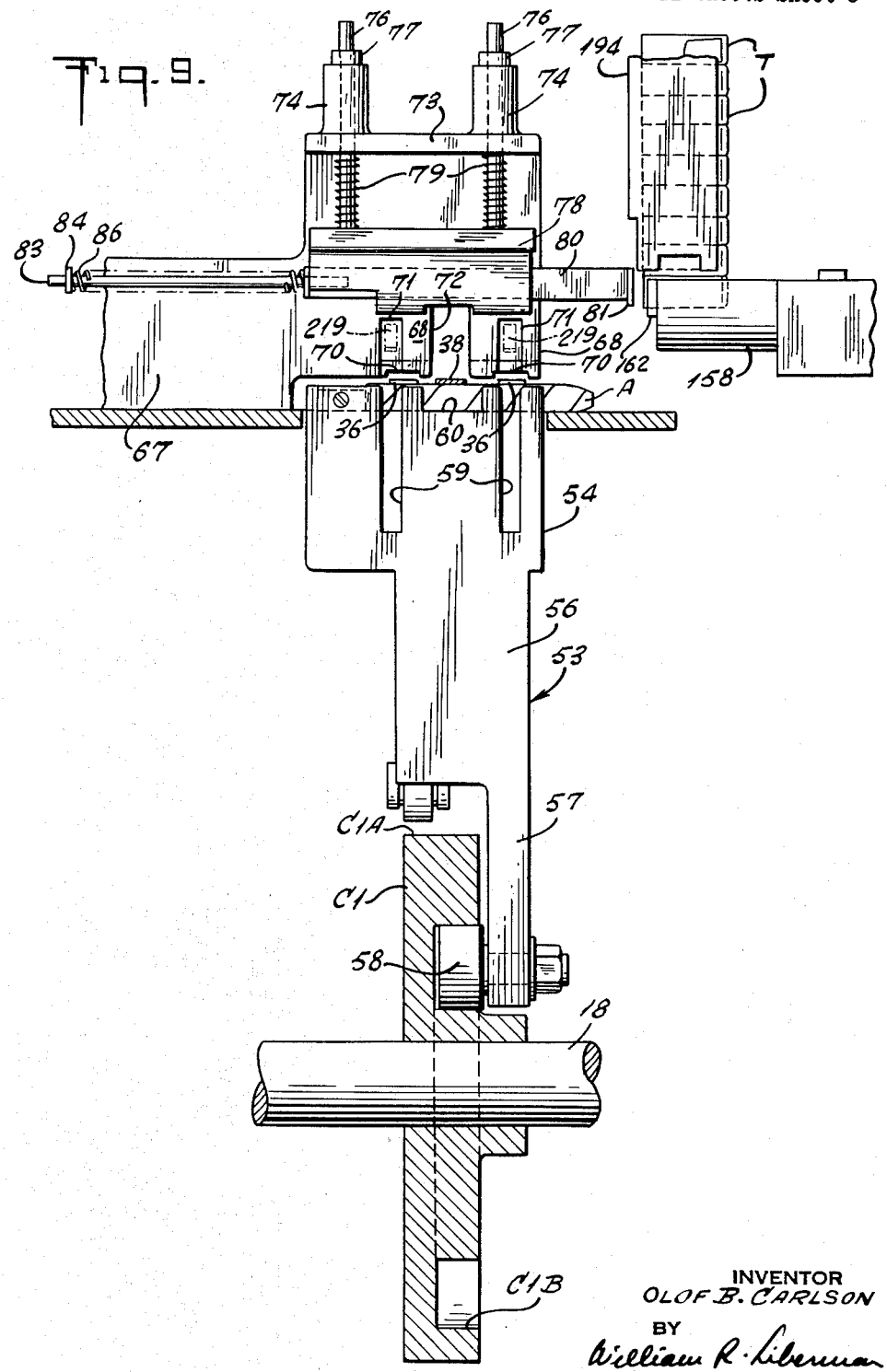

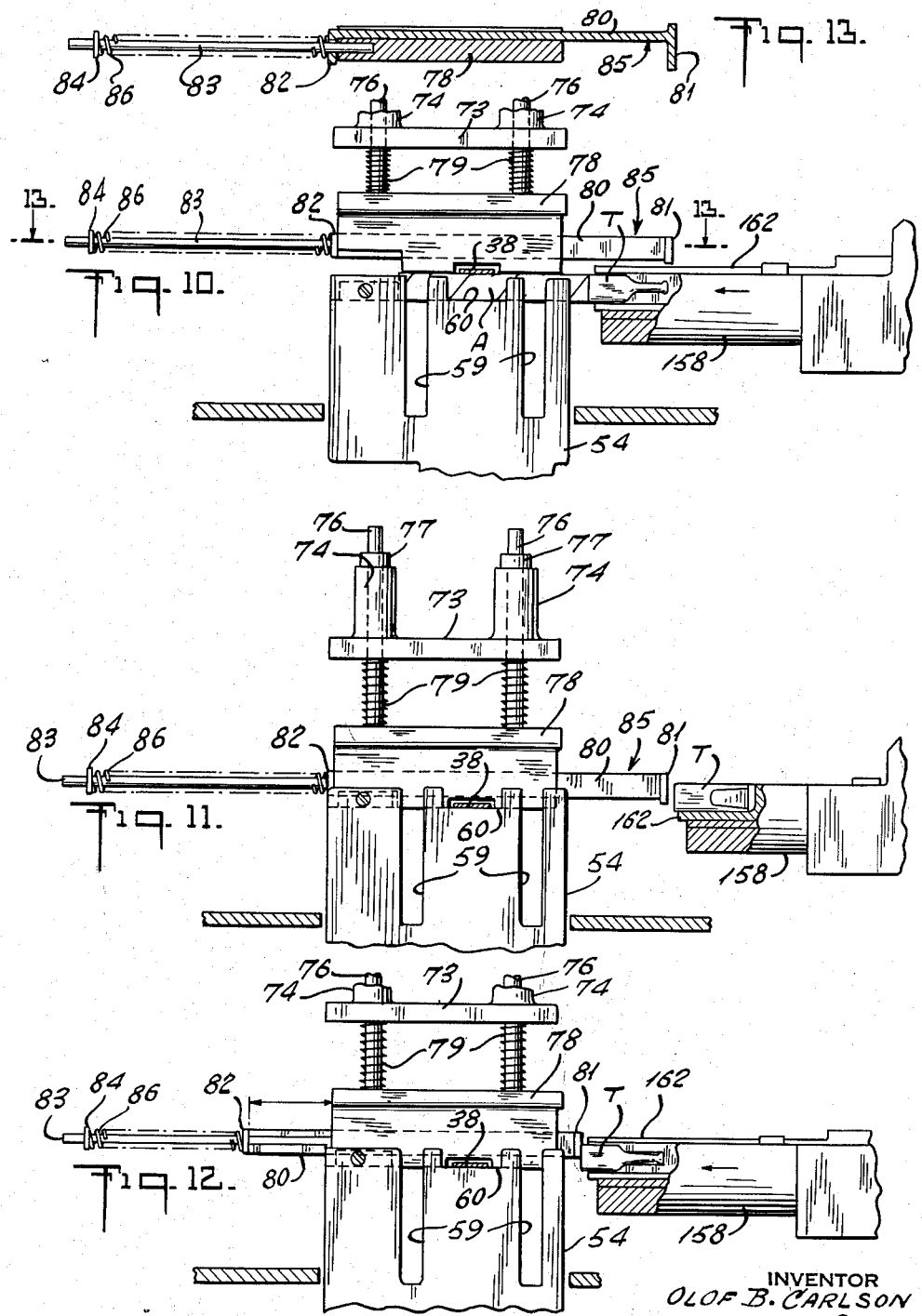

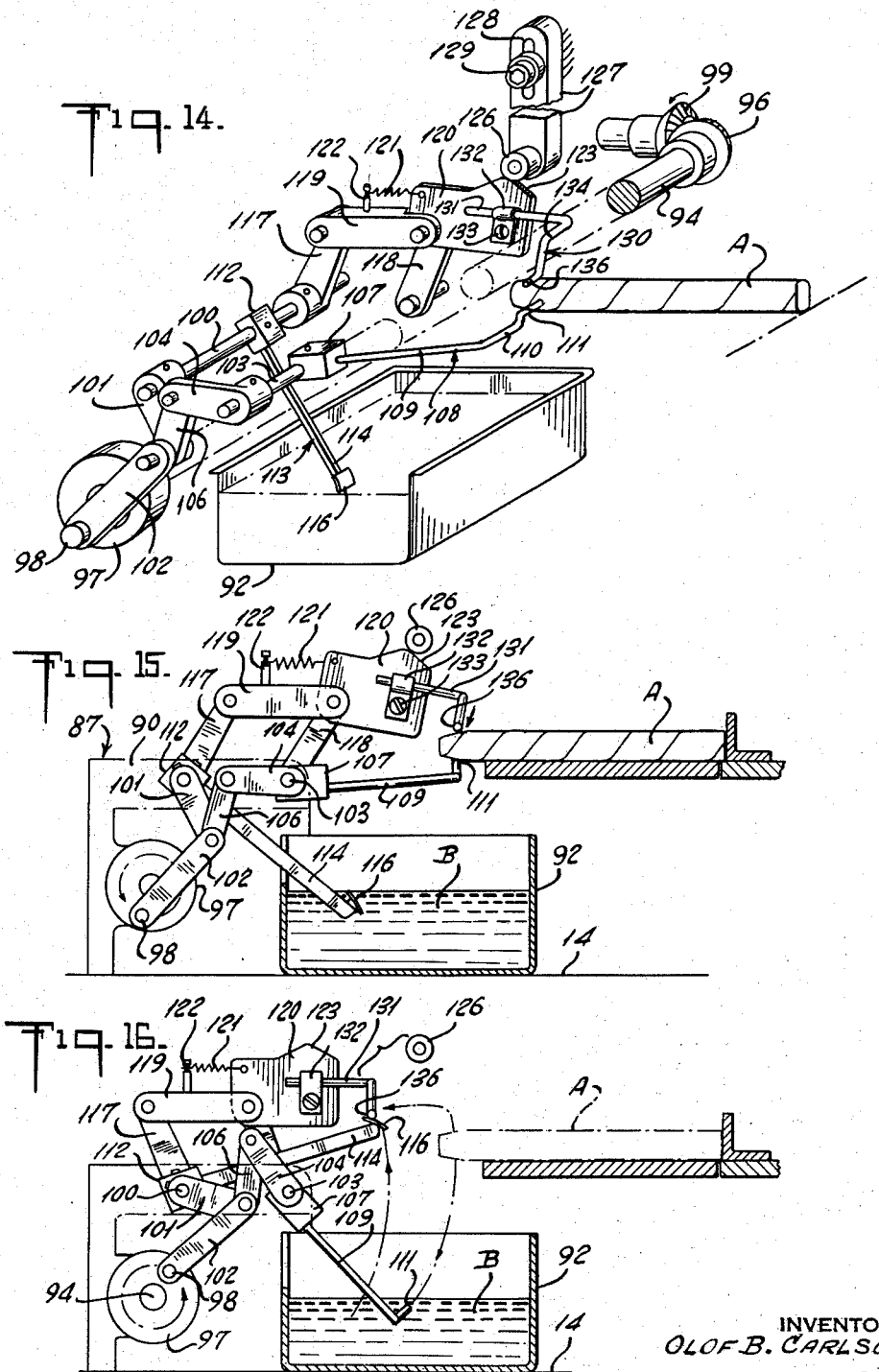

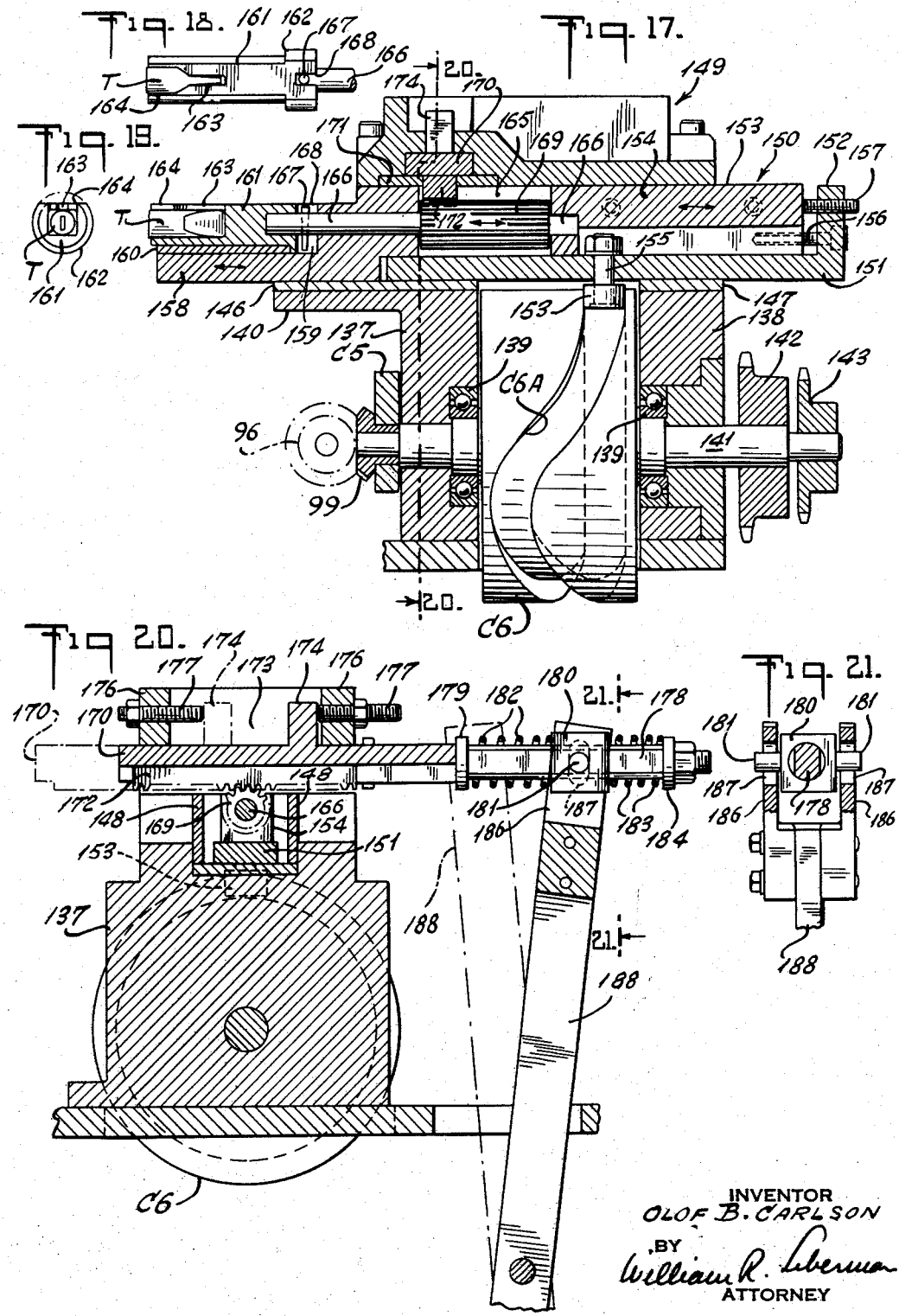

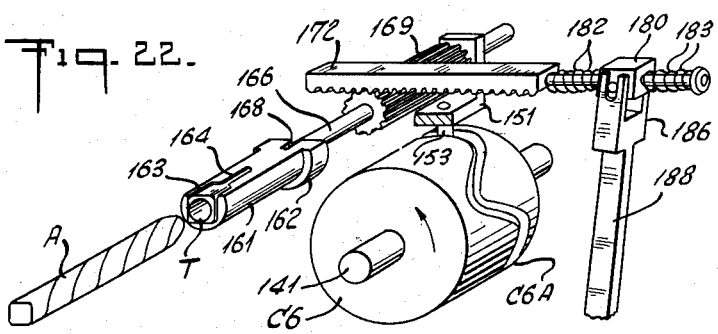
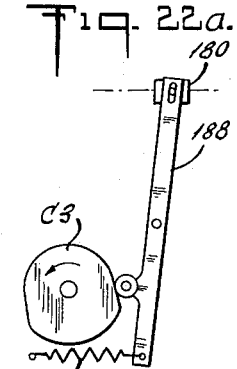
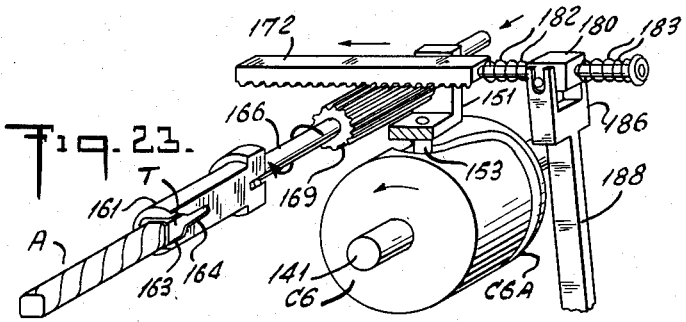
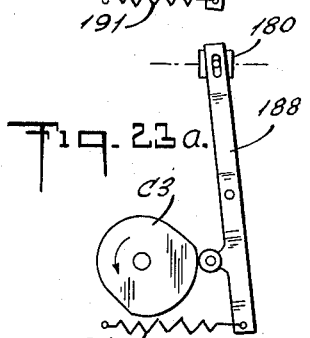
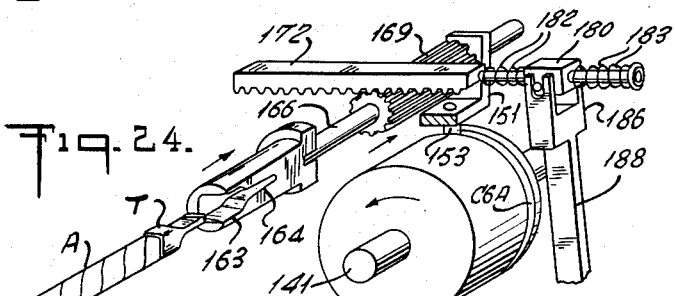
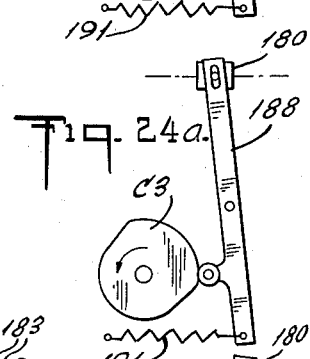
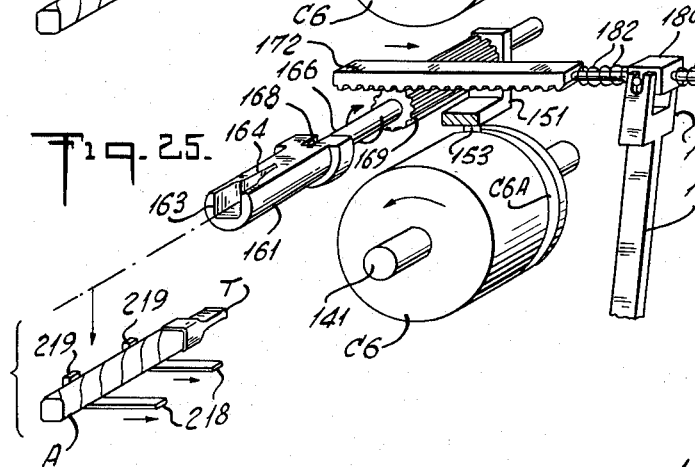
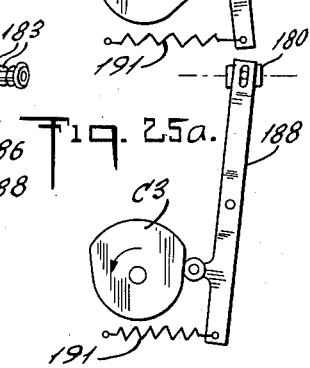

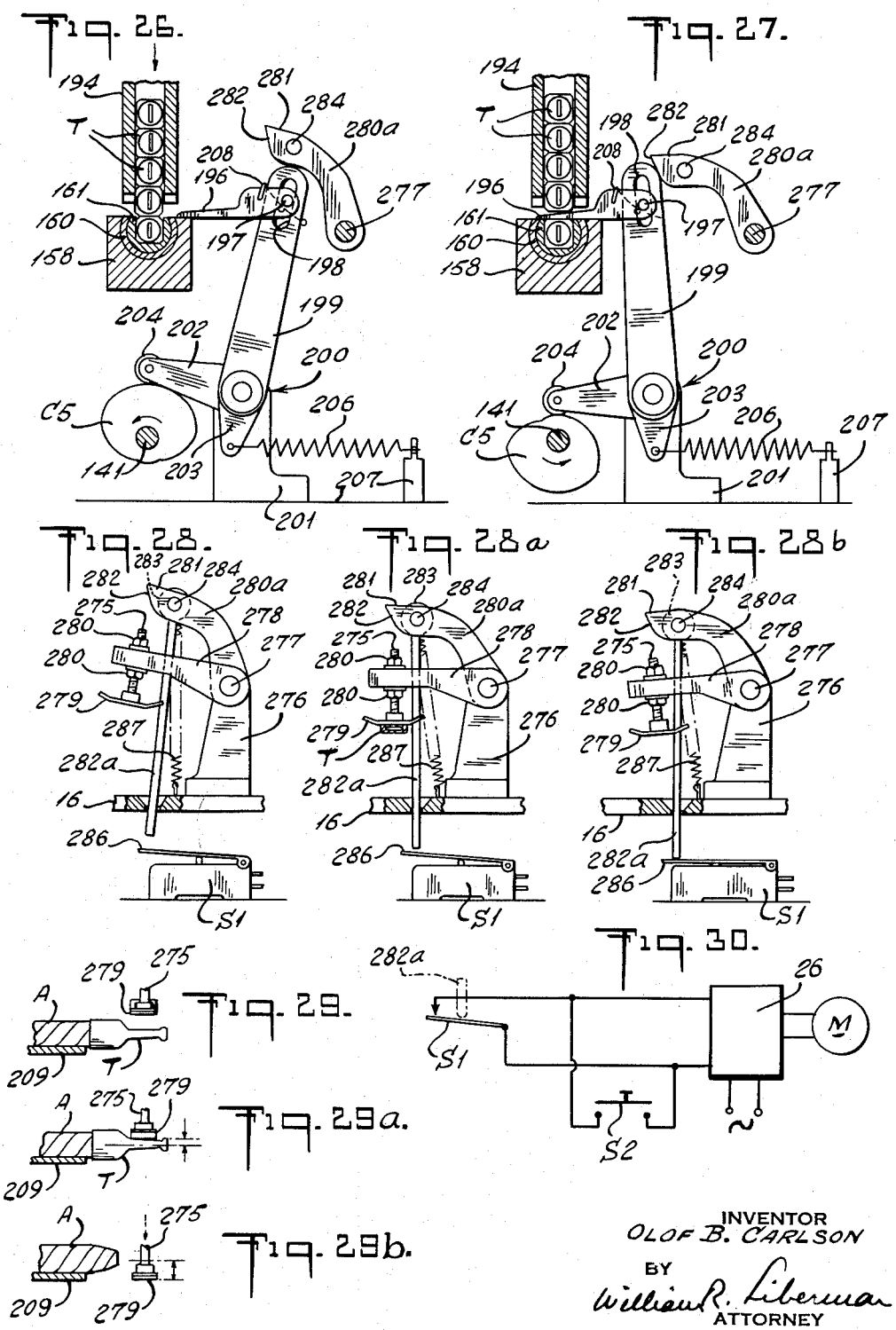

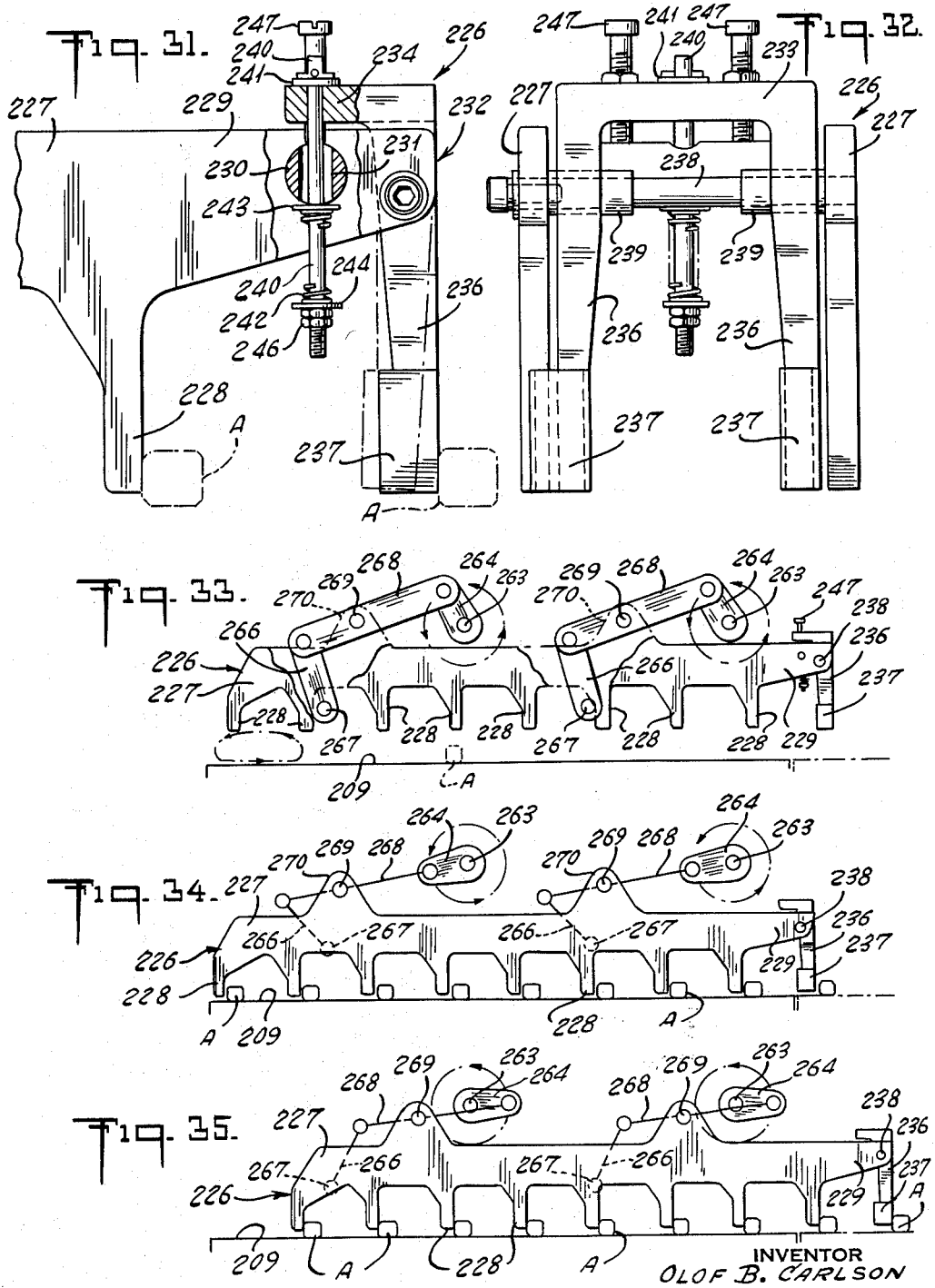

United States Patent Office 3,097,654
Patented July 16, 1963

3,097,654
CIGAR TIP APPLYING MACHINE
Olof B. Carlson, Philadelphia, Pa., assignor to Consolidated Cigar Corporation, New York, N.Y., a corporation of Delaware
Filed Aug. 11, 1961, Ser. No. 130,860
17 Claims. (Cl. 131—88)

The present invention relates generally to improvements in apparatus for the handling and processing of cigars. In particular, it relates to an improved machine for applying and securing mouthpiece holders, tips or the like to the ends of cigars.

Cigars are frequently marketed and dispensed with mouthpiece tips or holders attached thereto, and which are discarded with the smoked cigar. Many difficulties have been heretofore encountered in the machine application of the tips to the ends of the cigars in a firm and secure manner without damage to the cigar or to the tip. The cigar itself is of a frangible nature, being formed of a relatively friable material. The cigar body (filler and binder) is assembled and enclosed in an outer, spirally wound wrapper of leaf tobacco which is easily ruptured, deformed and unwound to the detriment of the cigar. The cigar tip or holder is usually formed by injection molding of an inexpensive synthetic organic thermoplastic material such as polystyrene, and must be handled with great care since it is of a relatively brittle nature. A cigar tipping machine of the nature of the present invention is described in U.S. Patent No. 2,981,262, granted April 25, 1961, to F. Farkas. The aforesaid machine, while capable of applying and securing tips to the ends of cigars, possesses certain drawbacks and disadvantages when employed in normal commercial environment. It is highly complex and difficult to service and is subject to frequent malfunctioning. Furthermore, it poses problems in coordinating the machine with other cigar handling and processing equipment and is inflexible in its application to cigars of varying sizes and shapes. In addition, the chances of damaging the cigars which are processed by the machine are high, and any malfunction of the machine in normal operation thereof causes damage to many cigars, passing of cigars which have not been tipped, and jamming of the machine with possible damage thereto.

It is, therefore, a principal object of the present invention to provide an improved apparatus for the handling and processing of cigars in connection with the application of mouthpiece tips or holders thereto.

Still another object of the present invention is to provide an improved machine for applying and firmly securing mouthpiece holders or tips to the ends of cigars without in any way damaging the cigar or the tip or impairing the smoking quality of the cigar.

A further object of the present invention is to provide an improved cigar mouthpiece tip applying machine which is highly flexible and versatile, which may be easily adjusted for use with cigars of various sizes and shapes, and which may readily be coordinated with other conventional cigar handling and processing equipment.

A still further object of the present invention is to provide an improved cigar tip applying machine wherein any malfunction in the operation of the machine is immediately indicated and does not result in continued defective and material destructive operation.

It is also an object of the present invention to provide a machine of the above nature which is characterized by structural ruggedness, simplicity of operation, easy serviceability, and dependability of operation.

The above and other objects of the present invention will become apparent from a reading of the following description, taken in conjunction with the accompanying drawings, wherein FIGURE 1 is a top plan view of a cigar tipping machine embodying the present invention;

FIGURE 3 is a fragmentary perspective view of the machine main drive and timing mechanism;

FIGURE 4 is a sectional view taken along line 4—4 in FIGURE 1, the machine being in a position immediately following the delivery of a cigar to the cigar elevator;

FIGURES 5 to 8 are sectional views taken along line 5—5 in FIGURE 1, the machine being illustrated in successive stages of its operation cycle;

FIGURE 9 is an enlarged detailed transverse sectional view of the tip applicator and cigar elevator and actuating mechanism, the elevator being illustrated in its depressed position and the tip applicator in its retracted position;

FIGURES 10 to 12 are fragmentary views similar to FIGURE 9, the machine being illustrated in successive stages of its operating cycle;

FIGURE 13 is a sectional view taken along line 13—13 in FIGURE 10;

FIGURE 14 is a perspective fragmentary view of the adhesive applying mechanism illustrated in its advanced adhesive applying state;

FIGURE 15 is a sectional view taken along line 15—15 in FIGURE 1;

FIGURE 16 is a view similar to FIGURE 15, the adhesive applying mechanism being illustrated in its retracted state;

FIGURE 17 is an enlarged detailed sectional view taken along line 17—17 in FIGURE 1;

FIGURE 18 is a top plan view of the tip applying spindle;

FIGURE 19 is a front elevational view of the tip applying spindle;

FIGURE 20 is a sectional view taken along line 20—20 in FIGURE 17;

FIGURE 21 is a sectional view taken along line 21—21 in FIGURE 20;

FIGURE 22 is a front fragmentary perspective view of cooperating elements of the tip applying mechanism and a registering cigar, the mechanism being illustrated immediately preceding the application of the tip to the cigar;

FIGURE 22a is a front elevational view of the rack drive associated with the tip applying mechanism, being illustrated in a position corresponding to the stage of FIGURE 22;

FIGURES 23 to 25 are views similar to FIGURE 22, the tip applying mechanism being illustrated in successive stages of the operation cycle;

FIGURES 23a to 25a are views similar to FIGURE 22 at successive stages of the operation cycle;

FIGURE 26 is an enlarged detailed sectional view taken along line 26—26 in FIGURE 1;

FIGURE 27 is a view similar to FIGURE 26, illustrated at another stage of the operating cycle;

FIGURES 28, 28a and 28b are front elevational views of the cigar carried feeler actuating mechanism and control switch at different stages of its operation;

FIGURES 29, 29a and 29b are end fragmentary views of the tip feeler element and a registering cigar in positions corresponding to FIGURES 28 to 28b;

FIGURE 30 is a schematic view of the machine interrupting circuit;

FIGURE 31 is a front enlarged fragmentary view of the leading end of the discharge transport mechanism;

FIGURE 32 is an end view thereof; and

FIGURES 33 to 35 are front elevational views of the cigar discharge conveying mechanism at successive stages of its operation cycle.

Figure 1:
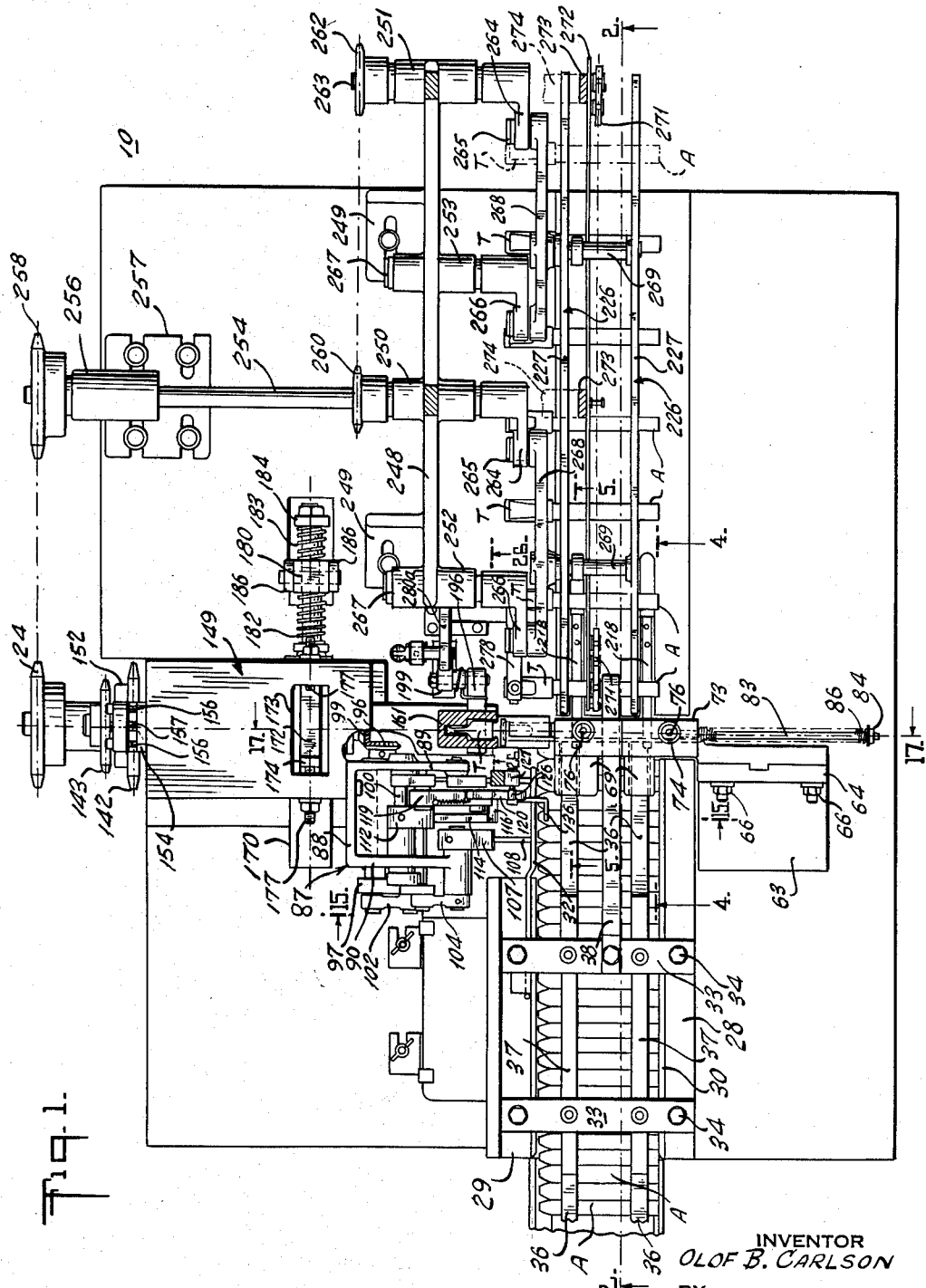

A feature of the present invention resides in the provision of an apparatus for applying mouthpiece holders, or tips or the like to cigars comprising means for transporting a cigar to a tipping station, means for applying a tip to said cigar at said tipping station, and means responsive to the location of a tip on said cigar following the application thereof at said tipping station for controlling the operation of the apparatus. The tip position responsive means actuates a switch which controls the machine drive whereby the absence of a tip on the cigar following the tipping station interrupts the machine operation. Since the absence of the tip on the cigar at the aforesaid position is an indication of the absence of cigars, the absence of tips or a malfunctioning of the machine, this relatively simple expedient functions as an overall safety device, prevents damage to the cigars, the tips and the machine and precludes discharge of untipped cigars.

Another feature of the improved machine is in the application of adhesive to the cigar at circumferentially spaced points which procedure minimizes friction between the abutting faces of the cigar and tip during the application of the tip, thereby preventing damage to the cigar or distortion of the cigar wrapper and assures a firm and uniform adhesion of the tips to the cigars. The unique mechanism for applying adhesive to the ends of the cigars comprises a pair of first and second applicator arms terminating in first and second applicator members respectively, a liquid adhesive reservoir, means swinging said applicator arms between relatively retracted spread and advanced contracted positions, said second applicator member being immersed in said reservoir when said second applicator arm is in its retracted position, a transfer arm terminating in a transfer member, and means swinging said transfer arm between a retracted position with said transfer member immersed in said reservoir and an advanced position with said transfer member engaging said first applicator member when said first applicator member is in its retracted position.

In the present machine, cigars are advanced in side-by-side relationship to an elevator which raises successive cigars into alignment with a tip applying member. In order to obviate damage to the cigars, means are provided according to the present invention immediately trailing the elevator for locking the cigar against rotation during the raising and lowering of the elevator. As a consequence, damage to the cigar which may result from any abrasion due to the rotation thereof is eliminated.

The tip-applying mechanism is featured by a rectilinear slide member registering with a correspondingly shaped track formed in a bracket in which is journalled a cylindrical cam, the slide member carrying a follower engaging the cam so as to reciprocate the slide in properly timed relationship. A tip applying spindle is rotatably mounted in a bracket adjustable along the length of the slide member and provided with an elongated axial pinion gear engaged by a rack. The rack is reciprocated along an adjustable path in adjustably timed relationship to the reciprocation of the slide member, thereby to accommodate it to cigars having wrappers wound in opposite senses. Means are provided to obstruct the open end of the cigar tipping spindle socket in the absence of a cigar, to prevent the ejection of the tip.

Figure 2:
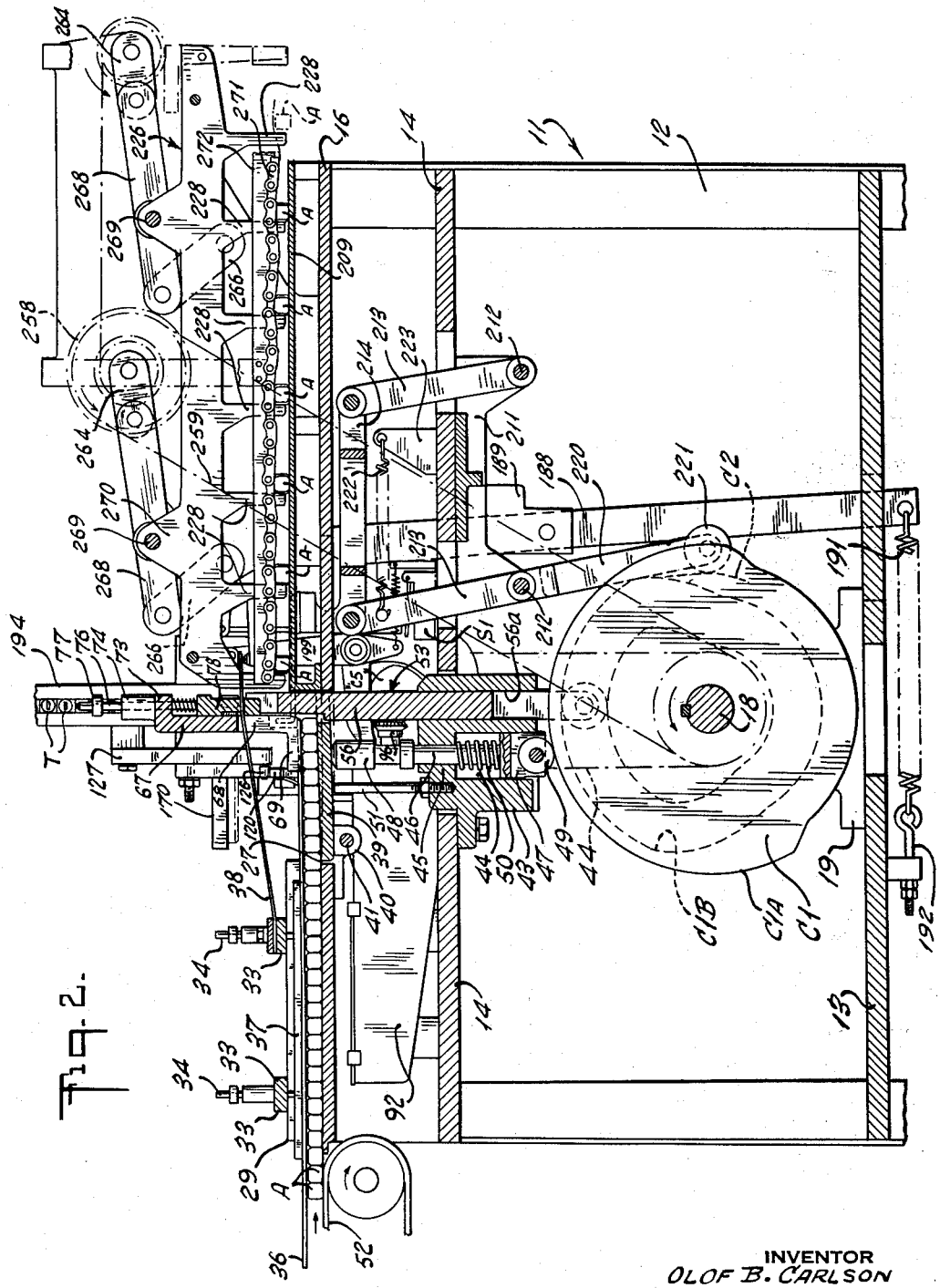
FIGURE 2 is a sectional view taken along line 2—2 in FIGURE 1.

Referring now to the drawings which illustrate a preferred embodiment of the present invention, and particularly to FIGURES 1 to 3 thereof, reference numeral 10 generally designates the improved machine which includes a table 11 supported by legs 12 and provided with a bottom shelf 13, an intermediate platform 14 and an upper platform 16. The machine main drive indicated as 17 is mounted on shelf 13, and intermediate platform 14 supports various of the motion translating and transmission arrangements as well as the tip and adhesive applying mechanisms. The cigar feed and discharge mechanisms as well as the tip sensing and tip gating mechanisms are mounted on upper platform 16.

The main drive 17 includes a cam shaft 18 journalled to bearing brackets 19 mounted on shelf 13 and having a pulley 20 keyed thereto. Pulley 20 is coupled by a belt 20a to a pulley 21 mounted on the output shaft of speed reducing unit 22, the input shaft of which is driven by a main drive motor M. Affixed to and driven with shaft 18 are an elevator and clamp motivating cam C1 provided with an outer cam surface C1A and a cam groove C1B formed in one face thereof, a transfer finger motivating cam C2 and alternate spindle rack motivating cams C3 and C4. Also affixed to the cam shaft 18 are sprocket wheels 23 and 24.

As seen in FIGURE 30, drive motor M is connected to a suitable source of current by way of a relay and a main switch circuit 26 in the usual manner. The motor relay is normally open and is energized to a closed motor energizing position by way of a normally closed switch S1 which is shunted by a normally open push button switch S2. The functions of switches S1 and S2 will be hereinafter set forth.

The cigar feeding system is located along the trailing section of upper platform 16 which has an aperture 27 formed therein. A pair of transversely spaced, longitudinally extending guide member defining parallel front and rear angle members 28 and 29 respectively are mounted atop the trailing section of platform 16 and are provided with confronting upright webs 30 which are separated about the length of a cigar. The guide member 29 extends to the trailing edge of aperture 27 and guide member 28 extends beyond said trailing edge. A finger 32, coplanar with web 30 of guide 29, projects forwardly beyond the leading edge of guide 29 to a point substantially transversely aligned with the leading edge of guide 28. A pair of longitudinally spaced, transversely extending bars 33 are disposed above and extend across guide members 28 and 29 and are vertically adjustably supported by sets of posts 34 projecting upwardly from guides 28 and 29. Located below and carried by bars 33 are a pair of transversely spaced longitudinally extending parallel reinforcing bars 37 which support a pair of transversely spaced parallel coplanar resilient guide strips 36 which extend from longitudinally rearwardly of the trailing edge of platform 16 to points shortly beyond the leading edges of guide member 28. A longitudinally forwardly normally downwardly inclined resilient finger 38 has its trailing end suitably clamped to the leading cross bar 33 and has its leading end extending beyond the strips 36.

Registering with aperture 27, as seen in FIGURES 1 to 7, is a clamping platform 39 having an upper surface normally coplanar with the upper face of the platform 16 and having a trailing edge adjacent to the trailing edge of the aperture 27. A pair of transversely spaced brackets 30 depend from the trailing border of the platform 39 and are hinged to a shaft 41 suitably secured to the underface of the platform 16 so that the leading section of the platform 39 may be raised and depressed to cigar clamp and unclamp positions respectively. Projecting forwardly from the leading edge of platform 39 are a pair of transversely spaced fingers 42 coplanar with platform 39.

In order to effect timed periodic raising and lowering of clamp platform 39, there is provided a bushing member 43 registering with an opening formed in the intermediate platform 14 and suitably bolted to the underface thereof. A vertical bore is formed in bushing 43 provided with an enlarged rectangular lower section 44 separated from the upper section by a peripheral shoulder 45. A cam rod 46 projects through the upper section of the bushing bore and terminates at its lower end in a yoke 47 slidably registering with bore section 44, and rod 46 carries at its upper end a pusher cap 48 having a convex top portion bearing against the underface of clamp platform 39, the cap 48 being vertically adjustable on rod 46. A cam follower roller 49 supported by yoke 47 engages cam surface C1A of cam C1, and is urged thereagainst by compression spring 50 carried by rod 46 and entrapped between yoke 47 and the peripheral upper shoulder of bore 44 resiliently to depress rod 46. A vertical rod 51 has a threaded lower end engaging a correspondingly tapped bore in bushing member 43, which rod may be locked in any vertically adjusted position by a lock nut suitably carried thereby. Rod 51 serves as a stop for the lower position of platform 39 and is adjusted preferably to limit platform 39 to a lower position substantially coplanar with platform 16.

A suitably driven endless belt 52 delivers and advances cigars A in side by side relationship to and along the path defined by webs 30, 30 of guides 28 and 29, guide strips 36 and platforms 16 and 39. Upon rotation of cam C1, the leading end of platform 39 is periodically raised to its clamp position in cooperation with an overlying jaw, as will be hereinafter set forth. Platform 39 is maintained in its clamp position by cam C1 during the motivation of the cigar elevator, also as will be described, and is unclamped during the dormant period of the depressed elevator to permit an increment advance of the cigars.

The mechanism for periodically raising successive cigars to a mouthpiece tip or holder receiving position is best seen in FIGURE 9, and comprises an elevator member 53 including upper, intermediate and lower sections 54, 56 and 57 respectively. The intermediate elevator section 56 is of rectangular transverse cross-section and slidably registers with a correspondingly shaped vertical bore 56a formed in the bushing member 43. Depending from and axially offset relative to the elevator section 56 is the lower section 57 which has suitably mounted adjacent its lower end a follower wheel 58 which engages cam groove C1B in a face of cam C1. The upper section 54 of elevator 53 has a broad vertical face which is reciprocable in a vertical plane along the leading edge of the platform 39, having a pair of transversely spaced deep vertical slots 59 formed therein registering with the platform fingers 42 and an intermediate shallow recess 60 between the slots 59 and in alignment with the finger 38. Projecting upwardly from the upper leading edge of elevator section 54 is an upright flange 61 which defines a stop member for properly locating and retaining a cigar A atop the elevator member 53. It should be noted that cam surfaces C1A and C1B are so shaped and related that elevator 53 is raised by face cam C1B following the raising of the platform 39 by edge cam C1A and that the elevator is lowered before the subsequent lowering of platform 39.

A support bracket 63 is located on the upper platform 16 in front of the leading portion of guide 28, and includes an upright flange 64 extending at right angles to guide 28 and provided with a vertical track or groove. A plate 65 is vertically adjustably mounted on the leading face of flange 64 and is provided with a ridge registering with the track or groove in flange 64, a pair of nuts and bolts 66 releasably locking the plate 65 in a vertically adjusted position. Integral with plate 65 and directed rearwardly therefrom is a bracket plate 67 having a flat leading vertical face substantially coplanar with the trailing face of elevator upper section 54 along which the latter is slidable. The lower edge of plate 67 is disposed above the lower edge of plate 65 and a pair of transversely spaced legs 68 depend from bracket plate 67 and terminate in trailing foot pieces 69 which cooperate with hinged platform 39 to form the cigar clamp arrangement, as aforesaid. Formed in the underfaces of foot pieces 69 are longitudinally extending grooves 70 which register with guide strips 36, and formed in the leading faces of legs 68 adjacent their lower extremities are recesses 71 which are in alignment with elevator slots 59. The vertical slot 72 between legs 68 registers with the leading end of resilient finger 38 to permit the vertical movement thereof.

Referring to FIGURES 1, 2 and 8 to 13, the plate 67 terminates at its upper end in a leading overhanging flange 73 carrying a pair of transversely spaced upwardly directed sleeves 74 aligned with openings formed in the flange 73. A rod 76 slidably registers with each sleeve 74, provided with threaded upper ends which engage adjusting nuts 77 bearing upon the top end faces of the sleeves 74. Mounted at the lower ends of rods 76 and slidable along the leading face of plate 67 is a clamp bar 78 having a flat underface aligned with elevator member 53 and resiliently urged with the rods 76 to a depressed position by a pair of compression springs 79 registering with the rods 76, entrapped between the confronting faces of flange 73 and clamp bar 78.

Formed in the trailing face of clamp bar 78 is a transversely extending groove which confronts plate 67 to delineate a bore of rectangular cross section. A tip retaining member 85 includes an elongated bar 80 extending through and slidably registering with the transverse groove and terminates at its rear end in a laterally projecting leg 81 in transverse alignment with clamp bar 78 and terminates at its front end in an apertured ear 82 likewise in transverse alignment with the clamp bar 78. Supported by and projecting forwardly from clamp bar 78 through apertured ear 82 is a rod 83 carrying a stop member 84 adjacent its free end. A compression spring 86 registers with rod 83 and is entrapped between stop member 84 and ear 82 thereby resiliently to urge retaining member 85 to its rearmost position.

The adhesive applying mechanism, as seen in FIGURES 1 and 14 to 16, includes a suitably mounted bearing bracket 87 disposed on intermediate shelf 14, trailing elevator 53, and comprises an upright rear plate 88 and a forwardly projecting, longitudinally spaced leading vertical plate 89 and upper arm 90 and forwardly projecting lower bearing lugs 91. Also mounted on intermediate platform 14 forward of bracket 87 is an open-topped receptacle 92 containing a suitable liquid adhesive B. Extending through and rotatably supported by bearing ears 91 is a shaft 94 having affixed to its leading end a first bevel gear 96 and to its trailing end a wheel 97 provided with a radially spaced eccentric pin 98. Bevel gear 96 engages a mating bevel gear 99 driven in a manner which will be hereinafter set forth. Journalled to and between a pair of aligned bushings carried by arm 90 and plate 89 is a rocker shaft 100 which projects through the arm-carried bushing and which has affixed to its trailing end a radial rocker arm 101. The free end of rocker arm 101 is connected by a link 102 to eccentric pin 98. Journalled in and projecting through a sleeve carried on the leading end of arm 90 is a rocker shaft 103 on the trailing end of which is mounted a rocker arm 104. The free end of rocker arm 104 is in turn connected by a link 106 to the free end of rocker arm 101.

Affixed to the inner end of rocker shaft 103 is a coupling block 107 which carries a lower applicator member 108 formed of rod and including a forwardly projecting arm 109 terminating in a laterally extending leg 110 provided with an upwardly offset, laterally extending applicator element 111. A coupling block 112 is secured to rocker shaft 100 intermediate its ends, which block carries an adhesive transfer member 113 including an arm 114 projecting radially forwardly from block 112 and terminating in an adhesive transfer plate or element 116.

An upwardly directed rocker arm 117 is secured to the leading portion of rocker shaft 100 immediately trailing bracket plate 89. An upwardly directed link 118, parallel to rocker arm 117, is pivoted at its lower end to bracket plate 89 forward of and at the level of rocker shaft 100. Pivotally connected to the upper ends of arm 117 and link 118 are the ends of a horizontal transversely extending cross-bar 119 to define, with rocker arm 117 and link 118, a parallelogram linkage mechanism. A bracket plate 120 is hinge-connected at its lower rear corner to the forward end of cross bar 119 and is swingable about a horizontal longitudinal axis. The upper ear corner of bracket plate 120 is connected by a tension spring 121 to a pin 122 mounted on cross bar 119 resiliently to urge bracket plate 120 counterclockwise and the forward end thereof upwardly to a position in alignment with cross bar 119.

The upper leading edge 123 of bracket plate 120 is forwardly, downwardly inclined to define a cam surface, and is engaged by a cam follower 126 mounted on the lower end of a support arm 127. Support arm 127 has a longitudinal slot 128 formed therein which registers with a nut-carrying mounting stud 129 to permit the adjustment of arm 127 and cam follower 126. An upper applicator member 130 includes an elongated arm 131 projecting forwardly from bracket plate 120 and adjustably secured to a face thereof by a strap member 132 which encircles arm 130 and is secured to bracket plate 120 by a screw 133. Arm 131 terminates in a laterally extending leg 134 provided with a downwardly offset applicator element 136. It should be noted that the applicator elements 136 and 111 and transfer element 116 are movable along paths lying in a common plane.

As illustrated in FIGURES 15 and 16, rotation of shaft 94 counterclockwise from the position shown in FIGURE 15 causes shaft 100 to be rocked counterclockwise by way of eccentric pin 98, link 102 and rocker arm 101, and causes shaft 103 to rock clockwise by way of eccentric pin 98, links 102 and 106 and rocker arm 104. The clockwise rocking of shaft 103 swings the lower applicator element 111 downwardly, immersing same in liquid adhesive B. The counterclockwise rocking of shaft 100 swings rocker arm 117 rearwardly to withdraw the cross bar 119 and bracket plate 120 therewith. The retracted bracket plate 120 carries applicator member 130 rearwardly and swings it upwardly under the influence of spring 121 and upon disengagement between cam follower 126 and cam edge 123. Simultaneously, shaft 100 swings transfer member 113 upwardly to carry transfer element 116 out of the liquid adhesive B into adhesive-transfer engagement with applicator element 136. Upon further counterclockwise rotation of shaft 94 from the position shown in FIGURE 16, the various elements are returned to the positions illustrated in FIGURE 15, the adhesive carrying applicator elements 111 and 136 engaging and applying adhesive to the upper and lower end surfaces of a registering cigar A, applicator member 130 being swung downwardly by cam follower 126 bearing upon the raised section of cam surface 123. The above cycle is repeated with each rotation of the shaft 94. It should be noted that the adhesive is applied to a cigar A spaced the width of several cigars from the leading cigar, which provides a desirable time lapse before the application of a tip to the cigar.

The tip applying assembly, as best seen in FIGURES 1 to 3 and 17 to 25 leads the adhesive applicator and is mounted on intermediate platform 14 rearwardly of elevator 53. The tipping assembly includes front and rear transversely spaced bracket blocks 137 and 138 respectively, having transversely aligned bores formed therein provided with confronting sockets housing ball bearing members 139, the front block 137 having a ledge 140 directed forwardly from the upper edge thereof. A suitable stepped shaft 141 is journalled in bearings 139 and projects beyond the outer faces of blocks 137 and 138, the forward end of shaft 141 having affixed thereto a cam C5 and the bevel gear 99 which drives the adhesive applicator mechanism. A pair of sprocket wheels 142 and 143 are affixed to the rear end of shaft 141, sprocket wheel 142 being connected by a chain 144 to sprocket wheel 23 on the main drive shaft 18, and the sprocket wheel 143 being chain-coupled to a cigar tip magazine and feeder. Disposed between the confronting faces of blocks 137 and 138 and affixed to the shaft 141 is a cylinder or drum cam C6 having a cam groove C6A formed in the peripheral surface thereof.

A transversely extending slide track of rectangular transverse cross section and extending medially across the top faces of blocks 137 and 138 and ledge 140 is delineated by horizontal front and rear horizontal bearing plates 146 and 147 separated to provide access to cam C6 and transversely extending longitudinally spaced vertical bearing plates 148. The top of the slide track is defined by the underface of a suitably shaped cover plate 149 secured in overlying relationship to the slide track.

A reciprocatable slide member 150 registers with the slide track and includes a base member 151 resting on plates 146 and 147, bridging the gap between them and terminating at its rear end in an upwardly directed flange 152. A cam follower roller 153 registers with cam groove C6A and is secured to the underface of base member 151 by means of a shank 155 passing through an opening in base member 151 and affixed thereto by a nut engaging the threaded upper end of shank 155. Mounted on and movable with base member 151 and adjustable along the length thereof is a spindle support member 153 which complements base member 151 to engage the slide track snugly and slidably. The rear section 154 of spindle support member 153 has a groove formed in the underface thereof registering with follower shank 154 to permit the relative longitudinal movement of spindle support member 153 and is provided with a flat rear face confronting flange 152. An adjusting screw 156 passes through an opening in flange 152 and engages an aligned tapped bore in slide section 154, the head of screw 156 nesting in a recess formed in the rear face of the flange. A set screw 157 engages a tapped bore formed in flange 152 and bears against the rear face of slide section 154. Thus, the longitudinal position of the spindle support member on base member 151 may be easily adjusted by means of screws 156 and 157.

The front section 158 of the spindle support projects forwardly of the front edge of base member 151, beyond the ledge 140, and rests on plate 146, and has a lateral recess formed in its lower rear corner engaging the leading end of base member 151. An elongated groove 159 of open topped arcuate cross section is formed in the top face of support section 158 and extends to the front face thereof, the rear portion of support section 158 extending to the underface of cover plate 149. The surface of groove 159 from the front edge to a point short of the rear face thereof is lined with a suitable bearing sheet 160.

A rotatable tip applying spindle 161 having an arcuate cylindrical underface rests on bearing sheet 160 and projects shortly beyond the leading edge thereof and is provided with an enlarged head 162 at its trailing end engaging the rear face of groove 159 and having a front shoulder abutting the rear edge of bearing liner 160. Formed in the front face of tip applying spindle 161 is an open topped tip-engaging socket 163 complementing the shape of the cigar tip T and including a rear section corresponding to the mouth end of the cigar tip and a front end corresponding to the cigar engaging end of the cigar tip. The top opening 164 in spindle socket 163 is such as to permit the transverse deposition of a cigar tip into the socket, whereas the socket 163 is so shaped as to permit the longitudinal removal of a cigar tip therefrom. Moreover, the socket is related to the cigar tip T as to engage the tip and not permit substantial relative rotary motion of the tip in the socket.

A well 165 is formed in spindle support member 153 between the front and rear sections 158 and 154, and transversely aligned bores communicate with well 165 through the flat opposite faces thereof, one of the bores extending to groove 159. A shaft 166 is journalled in the aforesaid bores, the front end of shaft 166 projecting into an aligned well formed in the rear face of spindle 161. Shaft 166 is keyed to spindle 161 by a tapered pin 167 projecting through a diametric bore formed in shaft 166 and registering with a diametric slot 168 formed in spindle head 162. An elongated pinion gear 169 nests in well 165 and is affixed to shaft 166, the end faces of gear 169 abutting the confronting end faces of well 165, rotation of gear 169 effecting corresponding rotation of tipping spindle 161.

Formed in the underface of cover plate 149 in communication with well 165 is a longitudinally extending groove of stepped rectangular transverse cross section in the base of which there reciprocatably nests a longitudinally extending slide bar 170, the side underborders of which rest on bearing plates 171 superimposed on the groove-stepped side shoulders. Mounted on the underside of slide bar 170 is a rack 172 which engages pinion gear 169, the latter being slidable transversely across rack 172. A longitudinal slot 173 communicating with the stepped groove is formed in cover plate 149 and a detent member 174 projects upwardly from slide bar 170 and slidably registers with and projects above slot 173. Located at opposite ends of slot 174 are a pair of upright posts 176 having longitudinally aligned tapped bores formed therein which engage lock nut carrying screws 177 disposed in the path of detent member 174 and permit the adjustment in the stroke of rack 172 and the rocking angle of spindle 161.

Projecting longitudinally from slide bar 170 is a rod 178 provided with a peripheral flange 179 at its inner end and being threaded at its outer end. A block 180, provided with laterally projecting pins 181, slidably engages rod 178 and is resiliently urged to an intermediate position along rod 178 by a pair of compression springs 182 and 183 registering with rod 178. Spring 182 is entrapped between flange 179 and the confronting face of block 180, and spring 183 is entrapped between the opposite face of block 180 and an annulus 184 carried adjacent the free end of rod 178 and adjustable by a nut engaging the threaded outer end of the rod. A yoke member 186, provided with elongated slots 187 which engage block pins 181, is mounted on the upper end of a rocker lever 188.

Lever 188 is pivoted intermediate its ends to a suitably mounted bracket 189 and is swingable in a longitudinal vertical plane. Projecting from lever 188 below its pivot point is a lug which supports cam following roller 190 which engages cam C3 and may alternatively engage cam C4, as will be hereinafter set forth. Normally resiliently urging lever 188 clockwise, as viewed in FIGURE 2, is a tension spring 191 connected between the lower end of lever 188 and an eyebolt 192 adjustably mounted on the underface of shelf 13. Cams C3 and C6 are so shaped and related that rack 172 is advanced by cam C3 and the coupling linkage, and spindle 161 rotated counterclockwise during the interval of application of the tip to the cigar while slide member 150 is urged to its advanced position by cam C6, and rack 172 is retracted immediately following the retraction of slide member 150. It should be noted that the counterclockwise application of the tip is so effected by reason of the corresponding sense of the winding of the cigar wrapper. Where the sense of the cigar wrapper is opposite, the application rotation of the spindle 161 is reversed to a clockwise direction by transferring cam follower 190 from cam C3 to the appropriately shaped adjacent cam C4.

Located directly above spindle 161 and in vertical alignment with top opening 164 therein when spindle 161 is in its retracted position, as best seen in FIGURES 9, 26 and 27 of the drawing, is a vertical tip delivery chute 194 carrying cigar tips T in stacked relationship above a bottom opening. A gate member 196 having a tapered leading end is slidable along a path extending between the bottom of chute 194 and spindle 161 between an advanced position in registry with the chute bottom opening and a retracted position out of registry therewith. The trailing end of gate member 196 is pivotally supported by a pin 197 slidably registering with an elongated slot 198 formed in the upper end of an upwardly directed arm 199 of a bell crank 200. Bell crank 200 is rotatably supported by a bracket 201 and includes a laterally projecting arm 202 and a depending arm 203. Arm 202 carries at its end a cam following roller 204 which engages cam C5, and the lower end of arm 203 is connected by a tension spring 206 to a stationary post 207 resiliently to urge bell crank 200 counterclockwise and gate 196 into registry with the chute discharge opening. Gate 196 is urged counterclockwise about pin 197 by a torsion spring 208 engaging gate 196 and crank arm 199 to bear downwardly on spindle 161. Cam C5 is so shaped and oriented relative to cam C6 that gate 196 is retracted when slide member 150 is in its retracted position and spindle opening 164 is directed upwardly to allow the lowermost tip T in chute 194 to drop into socket 163. Thereafter, gate 196 is advanced by cam C5 while slide member 150 is still retracted to close the chute opening and assure proper registry of the fed tip T in socket 163. The cycle is periodically repeated.

Referring to FIGURES 1 to 8 of the drawings, a discharge platform 209 is suitably mounted on and located above upper platform 16 and extends longitudinally from elevator 53 to the end of the discharge end of the machine. A pair of transversely spaced longitudinal slots 210 are formed in the trailing end of platform 209 in alignment with recesses 71 formed in clamp legs 68. A cigar transfer mechanism is supported by intermediate platform 14 and includes a bracket 211 mounted on the underface of platform 14 and pivotally supporting by means of pins 212 a pair of upwardly directed parallel links 213 projecting through openings formed in platform 14. The upper ends of links 213 are pivoted to the ends of a longitudinally extending horizontal cross frame 214 which defines therewith a parallelogram linkage and is located directly below platform 16. Mounted on the trailing edge of frame member 14 are a pair of transversely spaced arms 216 which project upwardly through an opening 217 formed in platform 16 in registry with slots 210. Suitably mounted on the top faces of arms 216 are transfer fingers 218 which are formed of strips and trail arms 216 and terminate in upwardly directed lips 219.

In order to impart a timed reciprocating motion to the transfer fingers 218, there is provided a lever arm 220 which is affixed to and depends from and in alignment with trailing link 213 and carries at its lower end a cam following roller 221 which engages cam C2. Frame member 214 is resiliently urged to its retracted position and follower 221 urged into engagement with cam C2 by a tension spring 222 connecting the upper portion of trailing link 213 to a stationary bracket 223. Cam C2 is so shaped and related to elevator cam groove C1B that the transfer fingers are advanced across the path of elevator 53 and into registry with clamp leg recesses 71 when elevator 53 is in its fully raised position, and are retracted immediately following the lowering of elevator 53 to transfer a cigar carried by elevator 53 onto platform 209.

The mechanism for advancing the tipped cigars along platform 209 to the discharge end of the machine, as best seen in FIGURES 1 to 3 and 31 to 35 of the drawings, includes a pair of transversely spaced similarly shaped parallel rake members 226 extending longitudinally along the length of platform 209 and rigidly joined to each other by a plurality of cross rods. Each rake member 226 includes a bridge section 227 provided with depending regularly longitudinally spaced teeth or leg members 228 terminating at a common level and a forwardly directed arm 229. Arms 229, trailing the leading ends thereof, are connected by a cross bar 230 having a vertical aperture 231 medially formed therein. A leading pusher member 232 of inverted U-shaped configuration is carried at the leading ends of rakes 226 and comprises an upper transversely extending bridge member 233 provided with a rearwardly directed flange 234 and a pair of depending legs 236. Legs 236 terminate in forwardly facing pusher elements 237 and are located between the rake members 226. Pusher member 232 is swingably supported by and between arms 229 by an axle 238 mounted between arms 229 and registering with bushings 239 projecting through legs 236.

A rod 240 extends through an opening in flange 234 and the aligned bar aperture 231, and carries at its upper end a head 241 which rests on flange 234. The lower end of rod 240 is threaded and carries a compression spring 242 entrapped between an upper washer 243 bearing against the underface of bar 230 and a lower washer 244 adjustably positioned along rod 240 by a pair of underlying nuts 246 engaging the threaded end of rod 240. Thus, pusher member 232 is resiliently urged counterclockwise under the influence of spring 242 to urge pusher elements 237 forwardly. The forwardmost position of pusher elements 237 is adjustable by means of a pair of screws 247 engaging vertical tapped bores in bridge flange 234 and bearing on bar 230.

A vertical mounting plate 248 is supported by brackets 249 atop platform 16 and carries a pair of longitudinally spaced upper transversely extending bearing sleeves 250 and 251 and a pair of longitudinally spaced lower transversely extending bearing sleeves 252 and 253 which are longitudinally offset relative to sleeves 250 and 251. A shaft 254 is journalled in and projects through sleeve 250 and a bearing sleeve 256 mounted by a bracket 257 on platform 16. A sprocket wheel 258 is affixed to the rear end of shaft 254 and is connected by a sprocket chain 259 to sprocket wheel 24 mounted on main drive shaft 18. Also mounted on shaft 254 rearwardly of sleeve 250 is a sprocket wheel 260 which is connected by a sprocket chain 261 to a sprocket wheel 262 carried by a shaft 263 projecting through sleeve 251. Mounted on the forward ends of shafts 254 and 263 are crank arms 264 which carry eccentric pins 265.

A pair of parallel upwardly directed rocker arms 266 are swingably supported at their lower ends by shafts 267 journalled in sleeves 252 and 253, the free ends of rocker arms 266 being connected by links 268 to respective eccentric pins 265 mounted at the end of crank arms 264. A pair of transverse rods 269 are mounted on links 268 between the ends thereof and project forwardly therefrom into supporting registry with transversely aligned collars formed in ears 270 extending above the upper edges of rakes 226. It should be noted that arms 264, arms 266 and levers 268 are parallel to the corresponding arms and levers and are synchronously driven, and arms 264 are shorter than arms 266. In the position illustrated in FIGURE 33, arms 264 and 266 are just past their upright position and are retracting rake members 226 while they are in their raised position. Arms 264 rotate counterclockwise to the positions illustrated in FIGURE 34, rocking arms 266 to their retracted positions and carrying the rake members to their retracted and then to their depressed positions by way of links 268. As arms 264 continue their counterclockwise rotation, arms 266 and links 268 are advanced, advancing rakes 226 while depressed to the forward position as seen in FIGURE 35. Thereafter, the rotating arms raise links 268 and rakes 226 and retract them while in raised position back to the positions illustrated in FIGURE 33. The cycle is periodically repeated, the path of the rakes being illustrated in broken line in FIGURE 33. The rake motivating mechanism is synchronized with the transfer finger motivating mechanism so that rake members 226 are retracted and depressed immediately following the retraction of transfer fingers 218. Furthermore, the longitudinal distance between successive rake teeth 228 is less than the longitudinal stroke of rakes 226 so that cigars are advanced along the platform 209 in increments greater than the inter-tooth distance and are engaged and advanced by successive teeth.

In order to retain advancing cigars in proper alignment along platform 209, an elongated weighted flexible member in the form of a sprocket chain 271 is loosely mounted at longitudinally spaced points to the bottom part of a support bar 272 extending substantially along the medial line of the cigar advance path and above platform 209. Bar 272 is secured to the bottoms of longitudinally spaced adjustable vertical support legs 273 which depend from the free ends of cantilever arms 274 projecting from suitably mounted posts. Chain 271 rests on the advancing cigars and maintains them against random movement during the intervening rest periods between their increment advances.

The mechanism for monitoring the operation of the tipping machine and for stopping the machine in the event of malfunctioning thereof or depletion of cigars or cigar tips includes, as best seen in FIGURES 1 and 26 to 30, an upright support bracket 276 mounted on upper platform 16 ahead of the tipping station and rearward of the platform 209. Journalled to the upper part of bracket 276 is a transversely extending rocker shaft 277, to the forward end of which is affixed a laterally projecting rocker arm 278. A threaded shank 275 projects through a vertical bore formed in the free end of arm 278, and carries at its lower end a feeler element or plate 279 having outwardly upwardly inclined leading and trailing borders. The vertical position of feeler element 279 relative to arm 278 is adjustable by means of a pair of lock nuts 280 engaging the shank 275 at opposite faces of arm 278. Affixed to the rear end of shaft 277 is an upwardly inclined rocker arm 280a including a laterally projecting leg 281 provided with a curved, cam defining underface 282. Swingably supported at the free end of leg 281 is a depending control rod 282a, the upper end of which terminates in a collar 283 engaging a transversely projecting axle 284 carried by leg 281 and the lower end of which slidably projects through an opening in platform 16 and is in vertical alignment with the free end of control arm 286 of the switch S1. Rocker arms 278 and 280a are resiliently urged counterclockwise to their depressed position by a tension spring 287 connecting axle 284 to a stationary pin mounted on the platform 16.

Arms 278 and 280a are periodically rocked by bell crank 200 which, in turn, is motivated by cam C5. The upper curved end of bell crank arm 199 which supports gate 196 engages cam surface 282 of rocker arm 280a, so that upon retraction of arm 199 and gate 196, arms 278 and 280a are rocked clockwise to their raised positions, as seen in FIGURES 26 and 28, and upon the advance of arm 199 and gate 196 to the gate close position, arms 278 and 280a are permitted to drop to their depressed positions under the influence of the spring 287, as seen in FIGURES 27, 28b and 29b. When rocker arm 280a swings to its depressed position, it lowers rod 282 to depress switch arm 286 thereby to open switch S1 and de-energize motor M to stop the tipping machine drive. It should be noted that during the normal operation of the tipping machine, the path of feeler element 279 during the rocking of arm 278 is interrupted by a tip T on a cigar A resting on platform 209 immediately following the positioning of the cigar A on the platform by transfer fingers 218 and before advance thereof by rake members 226. As a consequence, arms 278 and 280a are prevented from reaching their fully depressed position and the switch S1 is not actuated to an open position so that the machine continues its uninterrupted operation. It should be further noted that arms 278 and 280a are rocked toward their raised positions before the advance of cigars A by rake members 226. Thus, the tipping machine is automatically stopped when a tip T is not supported by a cigar A in the path of the feeler element 279, such event occurring upon depletion of cigars or tips or upon a deficiency in the machine operation. The machine may be restarted merely by closing switch S2 until rod 282 is raised.

Considering now the overall operation of the machine described above, the cigars A are advanced in side by side relationship by the belt 52 along the track defined by platforms 16 and 39 and guide members 28 and 29 toward the leading edge of the swingable platform 39. When elevator 53 is in its depressed position, platform 39 is lowered to permit the advance of the leading cigar A onto the platform of the elevator 53 where it is releasably retained in position thereon under the influence of the resilient finger 38 bearing upon the elevator-carried cigar. The plunger 48 is then lifted to raise the free end of platform 39 and clamp the leading cigar A trailing elevator 53 to prevent rotation thereof. As the successive cigars are advanced to elevator 53, adhesive is applied, as aforesaid, to opposite sides of the cigar end at a position spaced several increments from elevator 53.

Elevator 53 is then raised to carry a cigar into clamped relationship with the resiliently depressed bar 78 and in alignment with tipping spindle 161. The slide 150 is then advanced by cam C6, advancing the spindle 161 therewith which carries a cigar tip T in its socket 163, the spindle 161 being rotated as it approaches the aligned cigar A by the advancing rack 172. The cigar tip T is thus applied to the end of the cigar A with a twirling motion which effects a tight engagement of the cigar and the uniform spreading of the adhesive carried thereby. The slide 150 is then retracted and the rack 112 is thereafter retracted and spindle 161 returned to a position to receive another tip T from the magazine 194 through the spindle opening 164. A tip T is fed into socket 163 by reciprocation of gate 196 by arm 199. In the event of the absence of a cigar on elevator 53, clamp bar 78 remains in its depressed position with lock member 80 aligned with spindle cavity 163 to prevent the ejection of a tip T therefrom.

Following the application of a tip T to an elevator-supported cigar and the withdrawing of the spindle 161, elevator 53 drops thereby depositing the cigar on the advanced transfer fingers 218 which transport the cigar onto the platform 209. At the initial transfer position, feeler 279 is depressed and, in the absence of a cigar-supported tip, permits the opening of switch S1 by dropping rod 282 thereby to stop the machine. In the continued normal operation of the machine, the cigars are advanced to the discharge end along the platform 209 by the rakes 226 in the manner earlier set forth.

While there has been described and illustrated a preferred embodiment of the present invention, it is apparent that numerous alterations and omissions and additions may be made without departing from the spirit thereof.

What is claimed is:

1. An apparatus for applying tips or the like to cigars comprising means for transporting a cigar to a tipping station, means for applying a tip to said cigar at said tipping station, a tip magazine having a discharge opening and adapted to feed individual tips to said tip applying means, a closure gate movable between an advanced and retracted position in and out of registry with said discharge opening, means for motivating said apparatus, an electrical switch for activating and deactivating said motivating means and normally positioned in an activate position, a feeler member, means reciprocating said feeler member along a path between a retracted position and an advanced position intersected by a tip carried by said cigar at said tipping station, a switch control member movable with said feeler member between corresponding retracted and advanced positions and urging said switch to a deactivate position when said feeler member is in its advanced position, and means reciprocating said gate in synchronism with said feeler member.

2. An apparatus according to claim 1, including spring means urging said feeler member toward its advanced position.

3. An apparatus according to claim 1, including means for adjusting the position of said feeler member relative to said switch control member.

4. An apparatus for applying tips or the like to cigars comprising means for periodically advancing a plurality of cigars in side by side relation along a feed path toward a tipping station, means periodically applying a tip to successive of said cigars from the leading end of said feed path, and means for periodically applying adhesive to diametrically interrupted opposite points of successive cigars during the intervals between said periodic advance of said cigars, said adhesive applying means including a pair of applicator arms terminating in applicator elements and swingable between advanced positions engaging opposite surfaces of the end of a registering cigar and retracted spread positions, means for applying adhesive to said applicator elements when in their retracted positions and means for swinging said arms toward their advanced position during the intervals between the periodic advances of said cigars.

5. An apparatus according to claim 4, including an adhesive carrying reservoir, said applicator arms being swingable in a vertical plane, one of said applicator arms, when in retracted position, being immersed in said reservoir, and a transfer arm terminating in a transfer element and movable between a position immersing said transfer element in said reservoir and a position engaging the applicator element of said other applicator arm when said other applicator arm is in its retracted position.

6. A machine for applying tips or the like to cigars, comprising a tip applying member, means for feeding individual tips to said tip applying member, a cigar elevator vertically movable between a raised position in registry with said tip applying member and a depressed position and having a cigar support surface movable therewith, means advancing a plurality of cigars in side by side relationship to a discharge end registering with said cigar support surface when in depressed position and urged toward engagement with said vertically moving elevator, means periodically raising and lowering said cigar elevator, and means clamping the leading cigar posterior said discharge end against rotation during the raising of said cigar elevator.

7. A machine for applying tips or the like to cigars, comprising a tip applying member, means for feeding individual tips to said tip applying member, a cigar elevator vertically movable between a raised position in registry with said tip applying member and a depressed position and having a cigar support surface movable therewith, a platform terminating in a discharge edge registering with said cigar support surface when in said depressed position, means advancing cigars in side by side relationship along said platform toward said discharge edge and toward engagement with said vertically moving elevator, means periodically raising and lowering said cigar elevator, and means cooperating with said platform to clamp the leading cigar on said platform against rotation during the raising of said elevator.

8. An apparatus according to claim 7, wherein said discharge edge of said platform is vertically movable and said clamping means is defined by a jaw plate disposed above said platform adjacent said discharge edge thereof, and means raising said platform discharge edge during the raising of said elevator.

9. An apparatus according to claim 8, wherein said elevator and platform raising means include a rotatable cam provided with first and second cam surfaces, first and second followers engaging said first and second cam surfaces and coupled to said platform and cigar elevator respectively.

10. An apparatus for applying tips or the like to cigars, comprising an axially movable tip applying spindle having a tip engaging socket formed therein, first feed means for periodically depositing a tip into registry with said socket, second feed means for periodically advancing a cigar into axial alignment with said spindle, means periodically advancing said spindle toward said cigar to carry said tip into engagement therewith, and means locking said tip in said socket in the absence of a cigar in axially aligned registry therewith.

11. An apparatus for applying tips or the like to cigars, comprising an axially movable tip applying spindle having a tip engaging socket formed therein, first feed means for periodically depositing a tip into registry with said socket, second feed means for periodically advancing a cigar into axial alignment with said spindle, means periodically reciprocating said spindle between an advanced position toward said cigar and a retracted position away from said cigar, a stop member closely confronting said spindle socket and movable in the direction thereof and spring urged toward said socket and means actuated upon the advance of a cigar into alignment with said socket shifting said stop member out of alignment therewith.

12. An apparatus for applying tips or the like to cigars comprising an axially movable tip applying spindle having an axial tip engaging socket formed therein, a cigar elevator vertically reciprocable between a raised position in alignment with said socket and a depressed position, means periodically feeding a cigar to said elevator when in its depressed position, an upwardly movable cigar clamp member in vertical alignment with and disposed adjacent the upper end of said elevator when in raised position, and resiliently urged to its lowermost position, and a stop member carried by said clamp member in closely confronting position relative to said socket, said clamp member and stop member being raised out of alignment with said socket upon a cigar being raised by said elevator into alignment with said socket.

13. An apparatus according to claim 12, wherein said stop member includes an axially slidable rod carried by said clamp member, and spring means resiliently urging said rod toward said spindle.

14. An apparatus for applying tips or the like to cigars comprising a track member, a slide member having a leading end and a trailing end restricted to a longitudinal movement along said track member, a cylindrical cam having a cam groove formed in the surface thereof and rotatable along a longitudinal axis, a cam follower mounted on said slide member and engaging said cam groove, a spindle rotatable about a longitudinal axis and located at the leading end of said slide member and having a forwardly directed tip engaging socket formed therein, an elongated pinion gear coaxially affixed to said spindle, a transversely movable rack engaging said pinion gear, said pinion gear being longitudinally slidable along said rack, a rod projecting longitudinally from said rack, a block slidably engaging said rod, compression springs bearing longitudinally on opposite sides of said block, a rockable lever having an end connected to said block and carrying a second cam follower, a second cam engaging said second cam follower, means rotating said second cam in synchronism with said cylindrical cam, and means periodically advancing a cigar into axial alignment with said spindle.

15. An apparatus according to claim 14, including means for longitudinally adjusting the position of said spindle on said slide member.

16. An apparatus according to claim 14, including means for adjusting the stroke of said rack.

17. An apparatus according to claim 14, including means for varying the time relationship of the reciprocation of said longitudinally moving slide member and said transversely movable rack.

References Cited in the file of this patent

UNITED STATES PATENTS

| | | |
|---|---|---|
| 561,141 | Smyser | June 2, 1896 |
| 1,775,121 | Einfeldt | Sept. 9, 1930 |
| 1,830,446 | Schunemann | Nov. 3, 1931 |
| 2,452,357 | Collins | Oct. 26, 1948 |
| 2,572,312 | Burge et al. | Oct. 23, 1951 |
| 2,674,975 | Krueger | Apr. 13, 1954 |
| 2,827,904 | Halstead | Mar. 25, 1958 |
| 2,883,810 | Gieskieng | Apr. 28, 1959 |
| 2,981,262 | Farkas | Apr. 25, 1961 |
| 3,007,476 | Baugher et al. | Nov. 7, 1961 |